(No Model.)
W. HEISER.
BEER CASK.
No. 337,401. Patented Mar. 9, 1886.
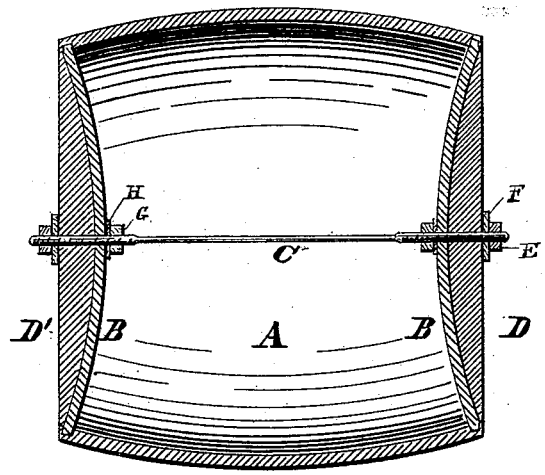
FIG. 1.
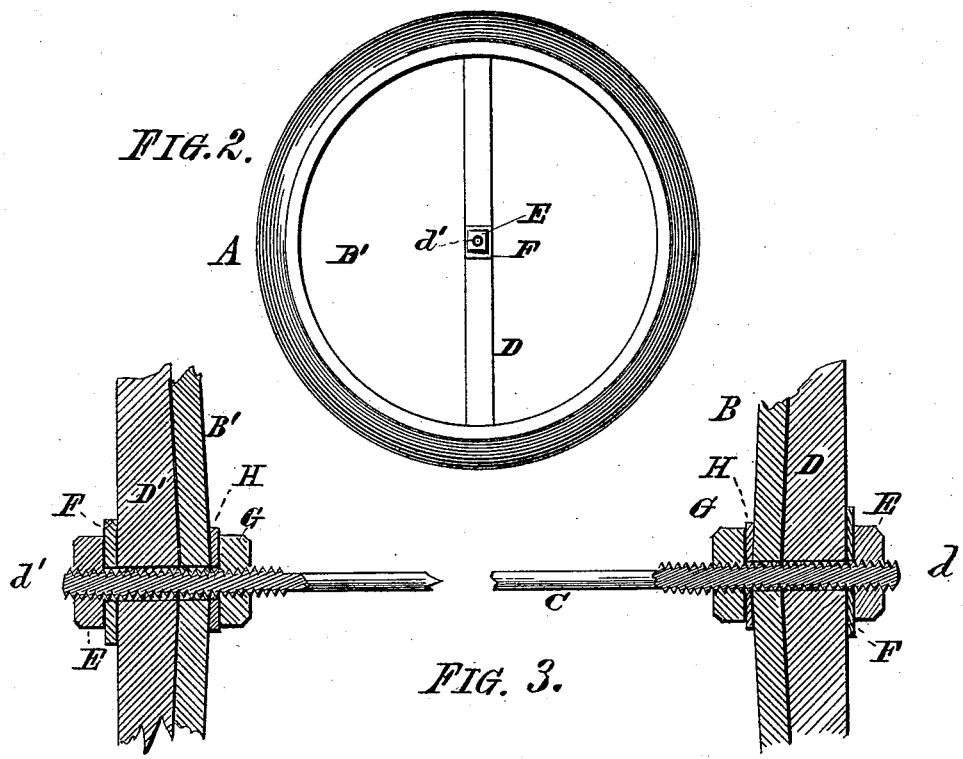
FIG. 2.
FIG. 3.
Witnesses:
Willie O. Stark
A. Stark
Inventor:
William Heiser,
by Michael P. Stark,
Attorney.

United States Patent Office.

WILLIAM HEISER, OF BUFFALO, NEW YORK.

BEER-CASK.

SPECIFICATION forming part of Letters Patent No. 337,401, dated March 9, 1886.

Application filed December 9, 1885. Serial No. 185,115. (No model.)

*To all whom it may concern:*

Be it known that I, WILLIAM HEISER, of Buffalo, in the county of Erie and State of New York, have invented certain new and useful Improvements on Beer-Casks; and I do hereby declare that the following description of my said invention, taken in connection with the accompanying sheet of drawings, forms a full, clear, and exact specification, which will enable others skilled in the art to which it appertains to make and use the same.

My present invention has general reference to improvements on beer-casks; and it consists, essentially, in the novel and peculiar combination of parts and details of construction, as hereinafter first fully set forth and described, and then pointed out in the claims.

In the drawings already referred to, which serve to illustrate my said invention more fully, Figure 1 is a longitudinal sectional elevation of a beer-cask provided with my improvements. Fig. 2 is an end view of the same. Fig. 3 is a longitudinal sectional elevation on an increased scale.

Like parts are designated by corresponding letters of reference in all the figures.

The object of my present invention is the production of a fastening for the heads of hogsheads, beer-casks, and similar large wooden vessels, which shall prevent the said heads from swelling or pushing out when pressure is applied to the liquid contained in said vessels, and their contracting when said pressure is removed.

Heretofore hogsheads and similar large barrels and casks were made with a central rod running through them, the object of said rod being to prevent the heads from spreading or swelling when pressure is applied. These rods are provided, usually, with a head on one end and a nut on the other end. This construction is faulty, inasmuch as said nuts and heads of the bolts will embed themselves into the wood when pressure exists in the interior of said casks; but as soon as this pressure is removed the heads will recede from the bolt-head and nut, and leakage of said barrels or casks will immediately follow. To avoid this drawback and great objection, I construct these hogsheads and casks A, substantially, with heads B B and brace them with rods C. On the outside of these heads, which are usually inwardly curved, I provide a brace-timber, D D', said brace-rod C being arranged to run through said heads and brace-timbers, as clearly shown in the drawings. The rods C have on each end an enlarged portion, $d$ $d'$, having screw-threads, and two nuts, E G, fitting said threads.

On the outside of the brace-timbers D D' there are, underneath the nuts E, large plates F F, and on the inside, underneath the nuts G G, there are washers H, of suitable material, against which said nuts bear.

In arranging these vessels I first bore holes of a diameter fitting the exterior of the screw-threaded portions $d$ $d'$, through the heads and brace-timbers, in about the center of the said heads. Then I remove three of the nuts mentioned and push the rod C through one of the heads. I then place a washer, two nuts, and a washer onto the rod in the inside of the cask, and then pass the rod through the opposite head and secure the last nut on the outside of said head. Now, I begin to tension the heads by turning the nuts G with a suitable wrench, in a direction in accordance with the thread on the rod C, so as to force said heads outward about to a position which they would occupy when under pressure, and then screw the outside nuts tight, it being understood that for this purpose an operator enters the interior of the cask through the usual man-hole, (not shown,) which said man-hole is afterward closed with the usual man-hole plate in a manner so well known and understood as not to require illustration by way of drawings.

It being a fact that the barrels and casks are for a longer time under pressure than off, it is obvious that by tensioning the heads to the position due to the average pressure there is but little if any strain on the nuts when the cask is in use. It therefore follows that leakage from continuous expansion and contraction is practically impossible.

The entire barrel or cask is readily constructed, and my invention adds but a trifle to the cost of the same, while the saving in time to calk the heads and the increased durability of the same is quite an item in favor of my invention.

Having thus fully described my invention, I claim as new and desire to secure to me by Letters Patent of the United States—

1. As an improved article of manufacture, a hogshead, barrel, or similar vessel having heads B B, brace-timbers D D', central rod, C, having enlarged screw ends $d\ d'$, nuts E and G, and plates and washers F H, the whole being constructed and combined substantially as described, for the purpose specified.

2. In beer hogsheads and barrels, the combination, with the heads B B, of the brace-timbers D D', central rod, C, and fastenings on the ends of said rod, whereby the heads B B may be expanded, and then locked in position, substantially as described, and for the use and purpose stated.

In testimony that I claim the foregoing as my invention I have hereto set my hand in the presence of two subscribing witnesses.

WM. HEISER.

Attest:
MICHAEL J. STARK,
JESSIE A. TULLEY.